United States Patent [19]
Boyce et al.

[11] Patent Number: 5,392,879
[45] Date of Patent: Feb. 28, 1995

[54] ELECTRONIC FAILURE DETECTION SYSTEM

[75] Inventors: Robert C. Boyce, Plano, Tex.; Michael A. Spaner, Waterbury, Conn.

[73] Assignee: Otis Elevator Company, Farmington, Conn.

[21] Appl. No.: 48,442

[22] Filed: Apr. 16, 1993

[51] Int. Cl.⁶ .......................... B66B 3/00; G06F 11/16
[52] U.S. Cl. .................... 187/393; 371/25.1; 371/68.3; 187/316
[58] Field of Search ............... 187/100, 101, 102, 103, 187/104, 105, 132, 135, 130; 49/120, 118; 371/25.1, 68.3

[56] References Cited

U.S. PATENT DOCUMENTS

| | | | |
|---|---|---|---|
| 4,326,606 | 4/1982 | Kuzunuki et al. | 187/100 |
| 4,350,225 | 9/1982 | Sakata et al. | 187/100 |
| 4,534,452 | 8/1985 | Ogasawara et al. | 187/29 A |
| 4,567,560 | 1/1986 | Polis et al. | 364/184 |
| 4,726,450 | 2/1988 | Fossati et al. | 187/111 |
| 5,107,964 | 4/1992 | Coste et al. | 187/104 |
| 5,136,595 | 8/1992 | Kimura | 371/68.3 |
| 5,149,921 | 9/1992 | Picado | 187/130 |
| 5,243,607 | 9/1993 | Masson et al. | 371/69.1 |
| 5,271,023 | 12/1993 | Norman | 371/68.3 |

OTHER PUBLICATIONS

Safety Code For Elevators And Escalators, An American National Standard, See Codes: A17.1-306.9(c), A17.1-111.9c, A17.1-112.2a, A17.1-112.2b.
Safety Code For Elevators, A National Standard of Canada, See Codes: B44-4.22.9, B44-3.12.9(c), B44-3.12.1.2.1, B44-3.12.1.4.4, B44-3.12.1.5, B44-2.13.2.1, B44-2.13.2.1, B44-2.13.2.2.2, B44-2.13.2.2.3.

*Primary Examiner*—Steven L. Stephan
*Assistant Examiner*—Robert Nappi
*Attorney, Agent, or Firm*—Joseph P. Abate

[57] ABSTRACT

An electronic failure detector includes an electronic processor having processor inputs and processor outputs, a memory connected to one of the inputs, a logic circuit having logic circuit inputs and logic circuit outputs, the logic circuit inputs and logic circuit outputs being connected to others of the processor inputs, and instructions, stored within the non-volatile memory, for causing the processor to perform a logic check of the logic circuit and to generate a first signal on the processor output if said logic check is true, and to generate a second signal on the processor output if said logic check is false.

5 Claims, 8 Drawing Sheets

STATE TRANSITION TABLE FOR THE LOGIC CIRCUIT 20
WHEN EMPLOYED AS A SAFETY LOGIC CIRCUIT FOR A HYDRAULIC ELEVATOR SYSTEM
DEFINITIONS:

DZ1, DZ2 - DOOR ZONE SENSOR INPUTS.
C - SAFETY CHAIN INPUT.
HGS - CAR GATE STATUS
HDFC - HOISTWAY DOOR STATUS

LOGIC EQUATIONS: L1

```
DZ   = DZ1+DZ2          F = A+B
CDZ  = DZ*C             H = F*C
CDFC = C*HDFC*HGS       G = C*E*G
SAFE = CDZ+CDFC         I = H+G
```

| A | B | C | D | E | F | G | H | I | |
|---|---|---|---|---|---|---|---|---|---|
| INPUTS | | | | | OUTPUTS | | | | |
| DZ1 | DZ2 | C | HGS | HDFC | DZ | CDFC | CDZ | SAFE | |
| 1 | 1 | 1 | 1 | 1 | 1 | 1 | 1 | 1 | CAR IS IN DOOR ZONE, DOORS CLOSED, SAFETY CHAIN IS INTACT. |
| 1 | 1 | 1 | 0 | 0 | 1 | 0 | 1 | 1 | DOORS OPEN, STILL SAFE. |
| 0 | 0 | 1 | 1 | 1 | 0 | 1 | 0 | 1 | OUT OF DOOR ZONE, DOORS CLOSED, STILL SAFE. |
| 0 | 0 | 1 | 0 | 1 | 0 | "1" | 0 | 1 | OUT OF DOOR ZONE, GATE SWITCH IS OPEN, SHOULD BE UNSAFE! -i.e. SHOULD BE "0" IF LOGIC CIRCUIT 20 OPERATED PROPERLY. |

IN LAST LINE OF STATE TABLE, CDFC IS HIGH "1", BUT SHOULD BE LOW ACCORDING TO THE LOGIC EQUATION FOR CDFC IN TABLE L1.

FIG.8

ELECTRONIC FAILURE DETECTION SYSTEM

TECHNICAL FIELD

The present invention relates to failure detection systems and, more particularly, to electronic failure detection systems employing an electronic processor (e.g., microprocessor).

BACKGROUND ART

Various electronic arrangements for detecting failures in electronic circuits are known. See, for example, the book *Elevator Technology*, published by Ellis Horwood Limited (England, 1986) and the book *Elevators*, by F. Annett, published by McGraw Hill Book Co., Inc. (1960) for discussions of certain electronic failure detection technology used in elevator systems.

However, the present inventors believe that further improvements in electronic failure detectors are achievable.

DISCLOSURE OF THE INVENTION

According to the present invention, a detector arrangement includes an electronic processor (e.g., microprocessor) having inputs and at least one output, a memory connected to one of the processor inputs, a logic circuit having logic circuit inputs and logic circuit outputs, the logic circuit inputs and outputs being connected to others of the processor inputs, and instructions for causing the processor to perform a logic check of the logic circuit and to generate a first electrical signal on the output if the logic check is true, and to generate a second electrical signal on the output if the logic check is false. The arrangement according to the invention can be employed, for example, as a safety feature to turn on and off motor driver circuits in elevator systems. Motor driver circuits are utilized to provide motive control in geared, gearless or hydraulic elevator systems. Typical hydraulic elevator systems are shown, for example, in U.S. Pat. No. 4,534,452, "Hydraulic Elevator," issued Aug. 13, 1985, by Ogasawara et al, and also in U.S. Pat. No. 4,726,450, "Hydraulic Elevator With Dynamically Programmed Motor-Operated Valve", issued Feb. 3, 1988, by Fossati et al., which are hereby incorporated by reference in their entireties.

It is a principal object of the present invention to detect failures in electronic circuits reliably and cost effectively.

It is an additional object of the present invention to provide a failure detection system employing redundant or parallel logic circuits or other parallel logic elements.

These and other objects, features, and advantages of the present invention will become more apparent in light of the following detailed description of a best mode embodiment thereof, as illustrated in the accompanying drawing.

BRIEF DESCRIPTION OF THE DRAWING

FIG. 8 shows Definitions, Logic Equations and a State Transition Table explaining the operation of a specific exemplary application of the invention when utilized as a safety arrangement in a hydraulic elevator system.

DETAILED DESCRIPTION OF THE BEST MODE

Figure 1:
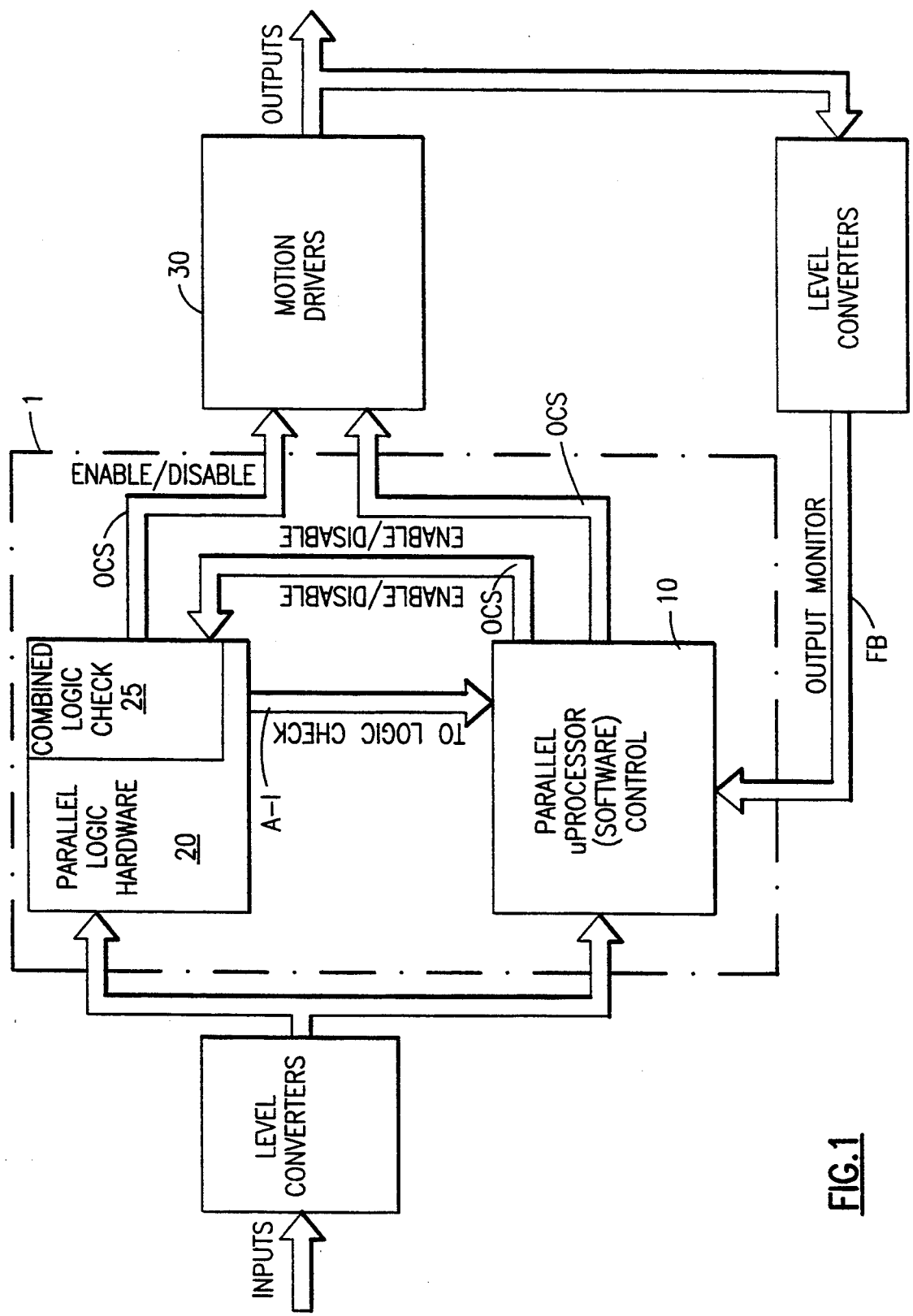
FIG. 1 is a schematic block diagram showing the failure detection system 1 of the present invention coupled to motion drivers and level converters.
Figure 2A:
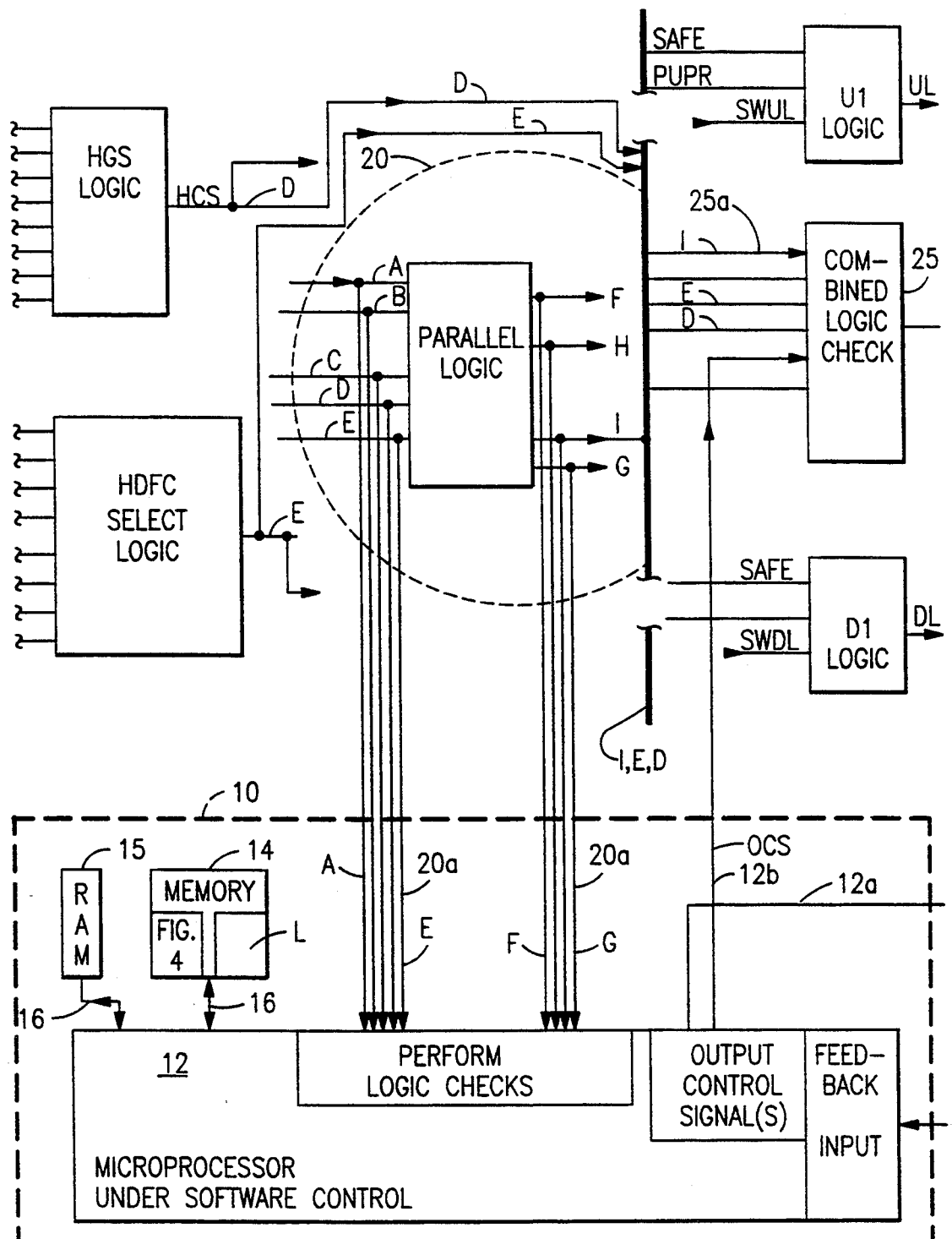
FIG. 2 shows details of a parallel logic circuit connected to a parallel processor control unit of FIG. 1; the logic circuit and the control unit are connected to an optional combined logic check unit, while the control unit and the check unit are each connected to a controlled circuit such as a two control input driver circuit having a feedback output and a power output.
Figure 2B:
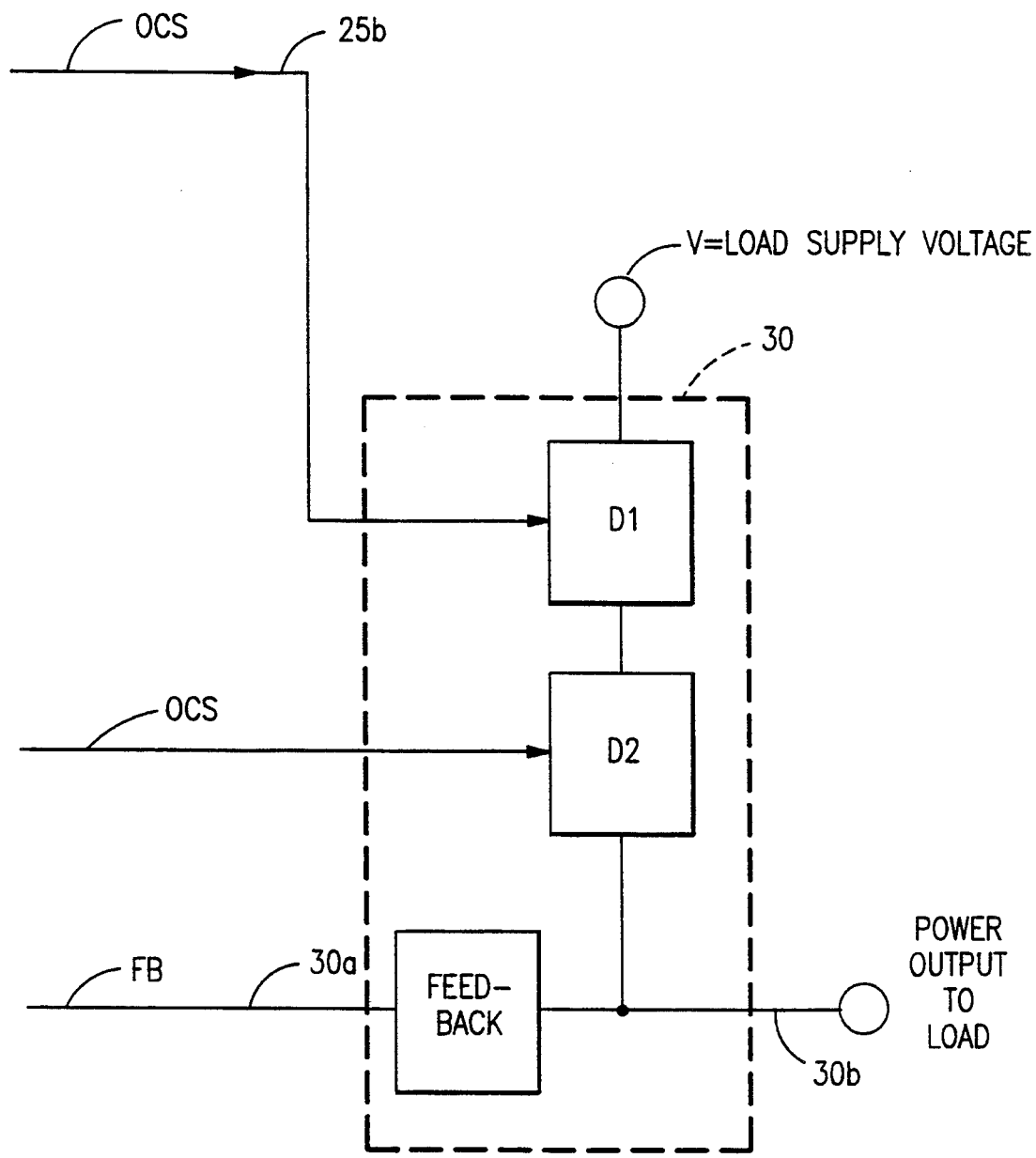
Figure 2:
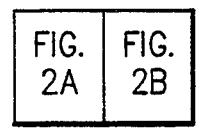
Figure 3:
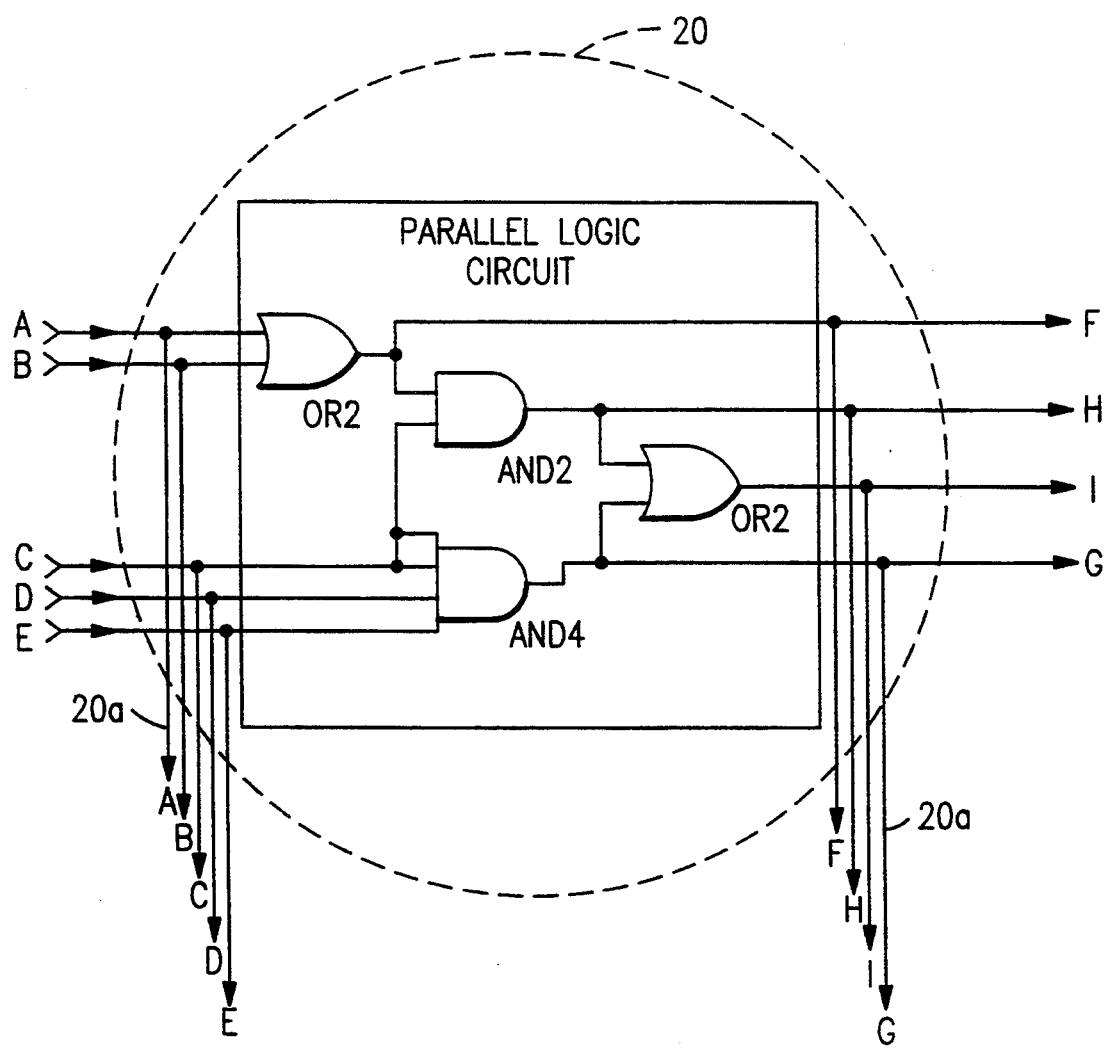
FIG. 3 is a more detailed schematic circuit diagram of the parallel logic circuit of FIG. 2.
Figure 7:
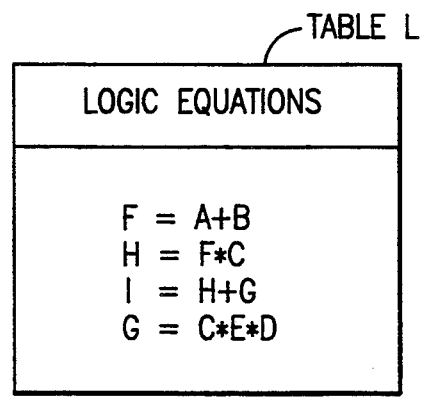
FIG. 7 is a Table L of four Boolean Logic Equations explaining the operation of the logic contained within the logic circuit 20 of FIG. 3.

FIG. 1 is a schematic block diagram of the detector arrangement 1 of the present invention coupled to various level converters (e.g., including A/D converters) and motion (e.g., motor) drivers. The detector arrangement 1 includes a microprocessor control unit 10 electronically coupled by means of logical check lines to a parallel logic circuit 20. FIG. 3 shows one embodiment of the circuit 20 having a plurality of input lines for signals A, B, C, D, E and a plurality of output lines for signals F, H, I, G connected to various "AND" and "OR" gates. The circuit 20 is, for example, a suitable integrated circuit. The logical check lines connected to the unit 10 include two groups of lines 20a tapped from the input and output lines and connected to inputs of the processor 12 (FIG. 2). The logic of the circuit 20 is expressed by the Boolean equations of the Table L (FIG. 7). According to the invention, the Boolean equations of the Table L are stored at a location L in the nonvolatile memory 14 (e.g., ROM, $E^2$PROM, FLASH) in known manner and utilized by the processor 12 as now discussed. The microprocessor control unit 10 monitors and stores the actual input signals A,B,C,D,E to and the actual output signals F,G,H,I from the logic unit 20, calculates all proper output values for the output signals of the unit 20, compares the calculated values against the actual signal values to determine whether a first output control signal OCS (e.g., logic 1 or Enable) or a second OCS signal (e.g., logic 0 or Disable) is generated by the processor 12 onto an output line such as a line 12a. The OCS is transmitted, for example, to one electronic on/off switch D2 (e.g., a suitable triac circuit) of the motor driver unit 30 via the line 12a. A logical 1 applied to the switch D2 via 12a turns D2 on; a logical 0 turns D2 off.

Figure 4:
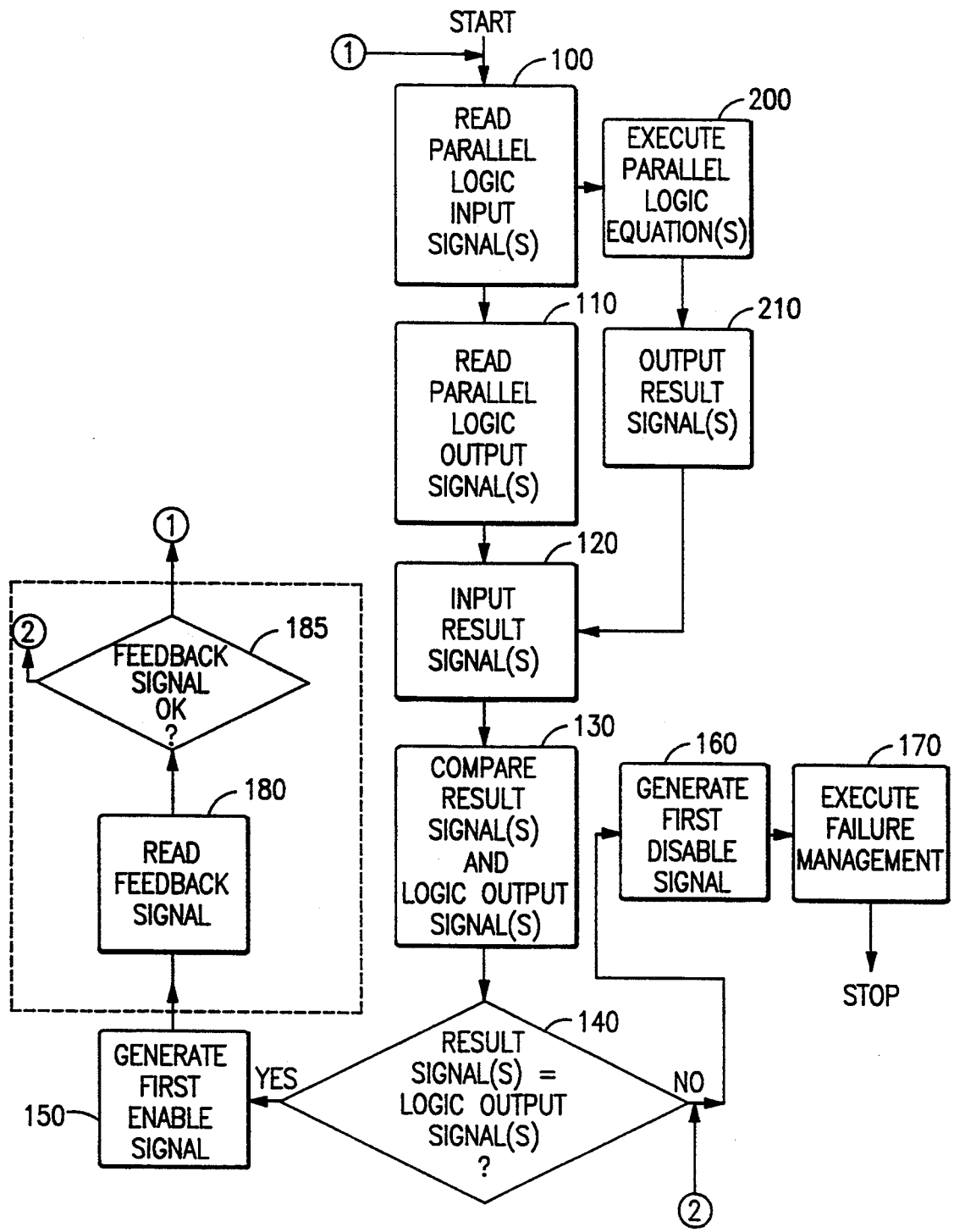
FIG. 4 is a high-level logic flow diagram showing relevant aspects of the operation according to the invention of the processor control unit of FIG. 1, including generation of an output control signal (e.g., Enable/Disable signal on the output line 12a) for controlling the motor driver circuit 30 of FIG. 2.

FIG. 2 shows details of the preferred arrangement 10, 20 connected to an optional combined logic check unit 25, and also shows a motor driver circuit 30 which is controllable by means of OCS signals. Other logic circuits are shown, but are unimportant for an understanding of the present invention. An input of the microprocessor 12 is coupled to the memory 14 via a bus 16. A RAM 15 is also coupled to an input of the processor 12 via a bus 16. Alternatively, the memories 14, 15, the CPU (not shown) of the processor 12 and various I/O ports are all connected to a common data, address and control bus (not shown) to permit transfer of information among RAM, ROM and the processor 12 in a manner well understood by those skilled in the electronic computer arts. The memory 14 includes instructions, for example, as shown in FIG. 4, for causing the microprocessor 12 to perform a complete logic check of the logic unit 20 and to generate either the first signal or the second signal on the output line 12a depending upon the result of the logic check. As an example, actual input signals A, B, C, D and E, and the output signals F, I, H and G are read and stored by the microprocessor 12; the microprocessor calculates a proper value F', I', H+, G' for each of the output signals F, I, H and G, and then compares the calculated proper values against the actual signal values to generate either the first or the second electrical signal on the line 12a. A logic 1 is generated on line 12a if F'=F, I'=I, H'=H and G'=G. Otherwise, a logic 0 is generated by the processor 12.

FIG. 3 and FIG. 7 show only one embodiment for the parallel logic unit 20. Preferably, I is determined by all of the input signals to the circuit 20. Other hardware and software implementations of the logic unit of FIG. 3 or other logic can be employed, provided that the control unit 10 compares all actual values of the output signals against calculated values (result signals) of the output signals to determine an output control signal (OCS) on the output line such as 12a. This comparison is performed using logic equations stored in the memory 14 which express logic equal to the logic which resides within the circuit 20.

In FIG. 4, the processor 12 reads and stores data equivalent to the input signals A, B, C, D, E and to the output signals F, G, H, I in any conventional fashion, steps 100, 110. Preferably, simultaneously with the steps 100, 110, the processor 12 fetches the Logic Equations (Table L) and executes the Equations using the stored (e.g., in RAM) actual data values for the input signals A, B, C, D, E to produce calculated values (result signals) F', G', H', I', step 200. The calculated values are suitably output from and input to respective internal portions of the processor 12 in any conventional manner, step 120. The calculated output signal values are compared against the actual output signal values, step 130. If each of the calculated values does not equal its respective actual value in a step 140, a step 160 causes the processor 12 to generate a disable signal (logic 0, low) on the line 12a and the processor executes routine failure management (e.g., turns on a trouble indicator light or executes other suitable software instructions to manage the failure), step 170. If the calculated values equal the actual values (step 140), the step 160 causes generation of an enable signal (e.g., logic 1, high) on the line 12a, and the routine returns to the step 100.

In a preferred variation of the routine of FIG. 4, a step 180 reads a feedback signal (e.g., digitized signal from an input line 30a to the processor 12) generated, for example, by any suitably digitized feedback circuit of the controlled circuit 30. The circuit 30 includes, for example, an on/off electronic switch D1 series connected to an identical on/off electronic switch D2. The switch D1 is connected to a suitable motor voltage supply source V (e.g., 120 VAC). When D1 and D2 are on, the load supply voltage appears at the output 30b and a digitized feedback signal FB which appears on the line 30a is, for example, high or a logic 1. If either D1 or D2 is off, the signal FB is low or a logic 0.

Returning to FIG. 4, a step 185 determines if the signal FB is proper, for example, a logic 1. If yes in the step 185, return to step 100. If no in the step 185 (e.g., if a logic 0 is read by the microprocessor), go to step 160.

Figure 5:
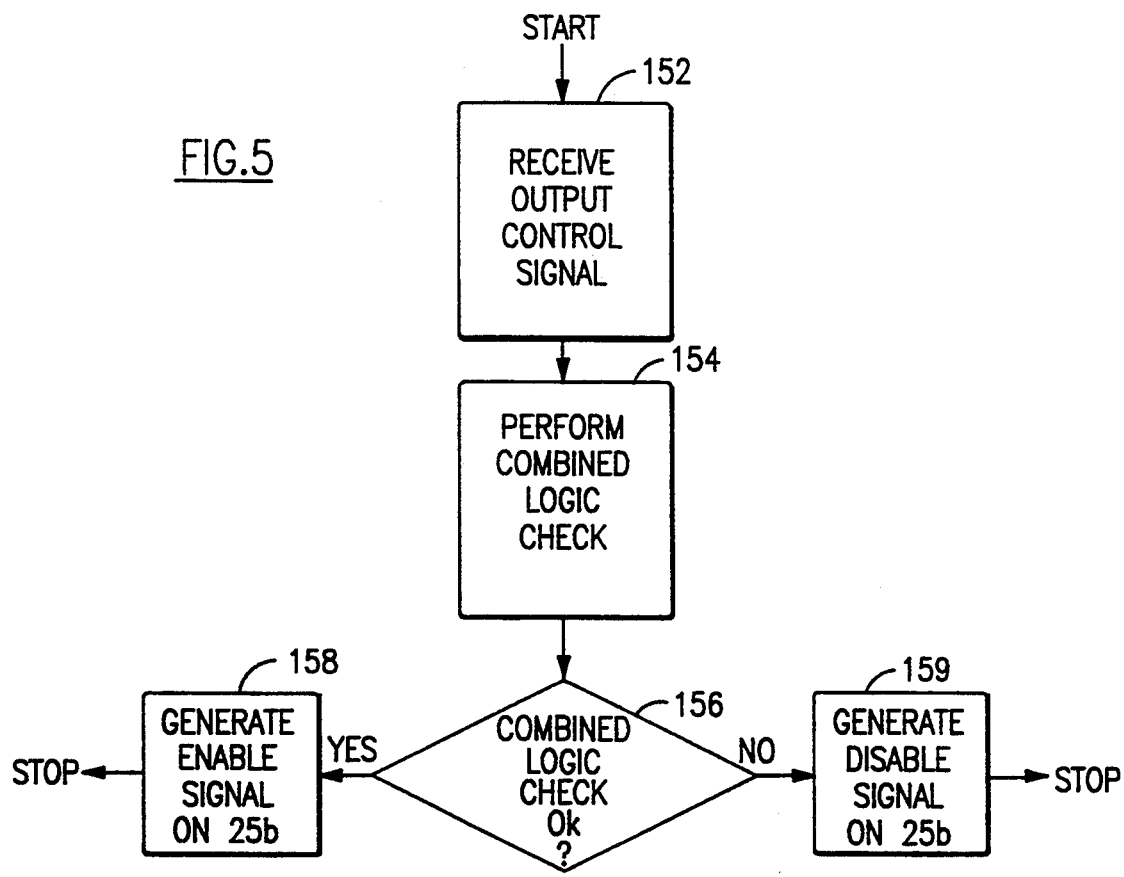
FIG. 5 is a high-level logic flow diagram explaining the operation of the combined logic check unit 25 of FIG. 2.

FIG. 5 is a high-level logic flow diagram describing an optional preferred feature of the invention which includes the combined logic check unit 25 (e.g., an AND gate) having at least one input 25a connected to an output of the circuit 20 and having another input connected to a second output 12b of the processor 12. An output 25b of the circuit 25 is connected to, e.g., the electronic on/off switch D1. See FIG. 2. When the unit 25 is employed in the invention, the processor 12 generates simultaneously first and second enable signals in the step 150 or first and second disable signals in the step 160 of FIG. 4. In a step 152 (FIG. 5), the unit 25 receives the OCS (enable or disable) from the processor 12 on the line 12b and a signal I on the input line 25a from the logic circuit 20. The unit 25 performs a combined logic check, step 154. If the combined check is true (for example, I equals 1 and OCS equals 1 and all other inputs to unit 25 are 1), then the unit 25 generates an OCS signal (e.g., logic 1) on the line 25b to turn the switch D1 on. If the combined logic check is false (either I or OCS or another input to 25 is logic 0), the unit 25 generates an OCS signal (logic 0) on the line 25b to turn switch D1 off.

Figure 6:
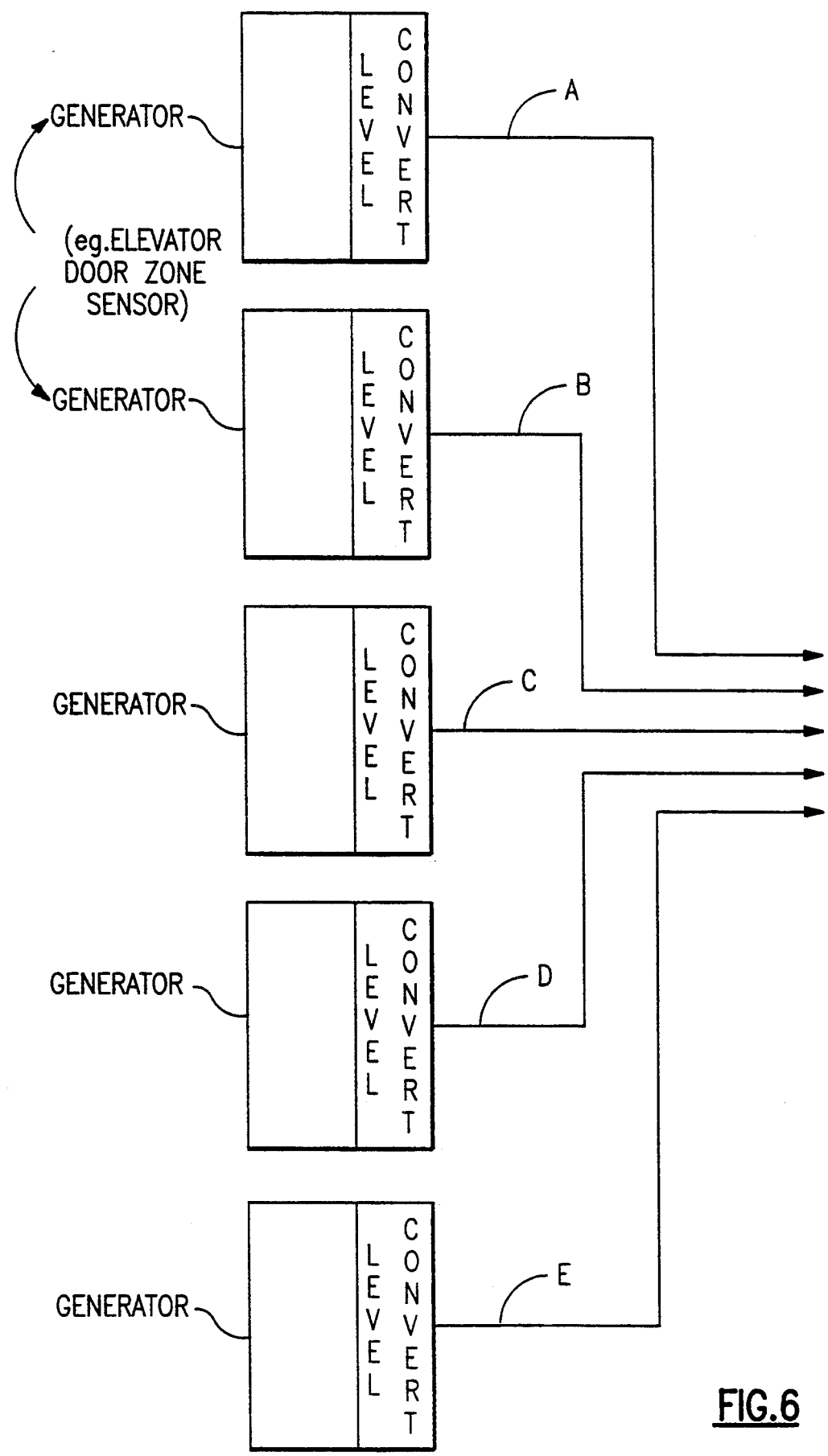
FIG. 6 is a schematic block diagram showing apparatus for generating the input signals A, B, C, D, E.

FIG. 6 is a schematic block diagram showing various hardware for generating the input signals A, B, C, D, and E. For example, such input signals may be several of those generated within an hydraulic elevator system while the logic checked by the microprocessor control unit 10 may be determined according to the logic equations of table L1 shown in FIG. 8.

In FIG. 8, an exemplary output for the signal CDFC (e.g., safety chain and doors fully closed) is shown as "failed high" (e.g., logic "1"). The proper value of CDFC is zero, i.e., CDFC=C*HDFC*HGS=1*1*0=0. According to the routine of FIG. 4, the microprocessor 12 detects this failure and transmits a suitable electrical OCS signal (e.g., logic 0) on the line 12a. That signal turns off the switch D2 and, thus, power to the load.

To reiterate the example, the last line of the table (FIG. 8) shows a failure of the output signal CDFC. CDFC shows high "1", when it should be low (0):

$CDFC = C * HDFC * HGS = 1 * 1 * 1 = 0.$

The processor control 10 detects this failure of the circuit 20 when the processor 12 performs logic checks using the Logic Equations of the Table L1 stored, e.g., in the memory portion L. When the processor 12 detects this single failure, the processor 12 generates an output control signal (OCS) on the line 12a to disable or deactivate the controlled circuit 30. In this case, OCS is, for example, a logic 0 for disabling the switch D2 of the motor driver 30. Optionally, the processor 12 also generates an identical OCS (logic 0) on the output line 12b for disabling the optional combined logic check unit 25 having an output line 25b also connected to the controlled circuit 30. In this case, OCS on the line 12b is, e.g., a logic 0 for disabling, e.g., the unit 25 which then also disables the switch D1.

In the step 152 (FIG. 5), the unit 25 receives the OCS (disable) from the processor 12 on the line 12b and a signal I or SAFE on the input line 25a from the logic circuit 20. The unit performs a combined logic check (e.g., AND gate), step 154. If the combined check is true (e.g., I=1 and OCS=1 and each other input to 25 equals 1), then the unit 25 generates an OCS logic 1 on the line 25b to turn switch D1 on. In our example, SAFE=0 so that the unit 25 generates an OCS=0 to turn switch D1 off.

In this further preferred embodiment of the present invention, the combined logic unit 25 permits an enablement signal on the line 25b only if all inputs I, OCS, E, D etc. to unit 25 have the proper value (e.g., 1). In addition, if the microprocessor 12 fails (e.g., outputs a logic 1 on the line 12a or 12b when the output should be 0), the logic unit 25 should still receive a signal I=0 on the line 25a and still transmit a signal on the line 25b which causes the motor driver 30 to turn off.

Finally, those skilled in the art will readily understand how to code and otherwise implement the present invention in view of the instant specification.

Although the invention has been shown and described with respect to a best mode embodiment thereof, it should be understood by those skilled in the art that the foregoing and various other changes, omissions and additions and the form and detail thereof may be made therein without departing from the spirit of and scope of the invention. For example, the processor can be programmed to read, evaluate and respond to the feedback signal FB (i.e., to generate a suitable OCS) at other desired locations in the routine of FIG. 4.

What is claimed is:

1. A detector, comprising:
    an electronic processor having processor inputs and processor outputs;
    a non-volatile memory connected to one of said processor inputs;
    a logic circuit having logic circuit inputs and logic circuit outputs, said logic circuit inputs and said logic circuit outputs being connected to others of said processor inputs;
    an and gate having gate inputs, and a gate output, one of said gate inputs being connected to one of said logic circuit outputs, another of said gate inputs being connected to one of said processor outputs;
    an electronic switch having switch inputs and a switch output, one of said switch inputs being connected to said gate output, another of said switch inputs being connected to another of said processor outputs, said switch output being connected to another of said processor inputs; and
    instructions, stored within said non-volatile memory, for causing said processor to perform a logic check of said logic circuit and to generate a first signal on said processor outputs if said logic check is true, and to generate a second signal on said processor outputs if said logic check is false, said first signal differing from said second signal.

2. A detector as claimed in claim 1, wherein said logic check includes instructions for reading actual values of signals on said logic circuit inputs, for determining a plurality of calculated values for signals on said logic circuit outputs, for reading actual values of signals on said logic circuit outputs, for comparing the calculated values against the actual values of said logic circuit outputs, and for causing generation of said first signal if said calculated values are equal to said actual values.

3. A detector as claimed in claim 2, wherein said instructions for determining said plurality of calculated values include instructions for determining said calculated values according to the equations:

$$F=A+B, H=F*C, G=C*E*D, I=H+G,$$

wherein A, B, C, D and E are input signals on said logic circuit inputs and F, G, H and I are output signals on said logic circuit outputs.

4. A detector as claimed in claim 3, wherein said signal A is an input signal from an elevator door zone sensor.

5. A detector as claimed in claim 4, wherein said signal B is an input signal from an elevator door zone sensor.

* * * * *

UNITED STATES PATENT AND TRADEMARK OFFICE
CERTIFICATE OF CORRECTION

PATENT NO. : 5,392,879

DATED : February 28, 1995

INVENTOR(S) : Robert C. Boyce, et al.

It is certified that error appears in the above-identified patent and that said Letters Patent is hereby corrected as shown below:

Col. 2, line 54, delete "OCS signal" and substitute --output control signal OCS--.

Col. 3, line 15, delete "H + G'" and substitute --H', G'--.

In Figure 8, delete "G = C*E*G" and substitute --G = C*E*D--.

Signed and Sealed this

Fifth Day of March, 1996

Attest:

BRUCE LEHMAN

*Attesting Officer*     Commissioner of Patents and Trademarks